(12) United States Patent
Ooseki

(10) Patent No.: US 6,177,623 B1
(45) Date of Patent: Jan. 23, 2001

(54) MUSIC REPRODUCING SYSTEM, RHYTHM ANALYZING METHOD AND STORAGE MEDIUM

(75) Inventor: Nobuhito Ooseki, Tokyo (JP)

(73) Assignees: Konami Co., Ltd.; Konami Computer Entertainment Tokyo Co., Ltd., both of Tokyo (JP)

( * ) Notice: Under 35 U.S.C. 154(b), the term of this patent shall be extended for 0 days.

(21) Appl. No.: 09/510,062

(22) Filed: Feb. 22, 2000

(30) Foreign Application Priority Data

Feb. 26, 1999 (JP) .................................................. 11-051852

(51) Int. Cl.[7] .............................. G09B 15/02; G10H 1/40; G10H 7/00
(52) U.S. Cl. ........................... 84/477 R; 84/610; 84/611; 84/634; 84/635; 84/650; 84/651
(58) Field of Search ..................... 84/600–604, 609–612, 84/634–636, 649–652, 666–668, 477 R, 478

(56) References Cited

U.S. PATENT DOCUMENTS

| | | | |
|---|---|---|---|
| 5,453,568 | * | 9/1995 | Tajima et al. ........................... 84/609 |
| 5,508,470 | * | 4/1996 | Tajima et al. ........................... 84/609 |
| 6,028,262 | * | 2/2000 | Minamitaka ............................ 84/611 |
| 6,096,962 | * | 8/2000 | Crowley ................................. 84/611 |

FOREIGN PATENT DOCUMENTS

| | | |
|---|---|---|
| 62-283397 | 12/1987 | (JP) . |
| 63-170697 | 7/1988 | (JP) . |
| 4-141693 | 5/1992 | (JP) . |
| 10-161675 | 6/1998 | (JP) . |

* cited by examiner

Primary Examiner—Robert E. Nappi
Assistant Examiner—Marlon T. Fletcher
(74) Attorney, Agent, or Firm—Bachman & LaPointe, P. C.

(57) ABSTRACT

In a music reproducing system, each of characters is allocated in advance a favorite rhythm component and a peculiar figure expressing ability. A sound pressure data producing section produces sound pressure data for each of a plurality of frequency bands from musical data. A frequency band identifying section identifies the frequency band which beats a rhythm most. A rhythm estimating section derives a changing period of a sound pressure component in the sound pressure data at the identified frequency band and estimates a rhythm component based on the derived changing period. A character managing section cumulatively changes a figure expressing ability of a displayed character according to the matching degree between the estimated rhythm component and a favorite rhythm component of the displayed character. A display control section changes a display figure of the displayed character according to the figure expressing ability thereof while musical data is reproduced.

18 Claims, 7 Drawing Sheets

BASE DATA

FIG. 5B

FREQUENCY A

FIG. 5C

FREQUENCY B

FIG. 5D

FREQUENCY C

MUSIC REPRODUCING SYSTEM, RHYTHM ANALYZING METHOD AND STORAGE MEDIUM

BACKGROUND OF THE INVENTION

1. Field of the Invention

The present invention relates to a music reproducing system having a function of accurately extracting a rhythm component of musical data upon reproduction thereof and changing a display figure of a character based on the extracted rhythm component.

2. Description of the Related Art

There are many personal computers and video game apparatuses provided with a device for reading a CD-ROM storing program codes and various data. Most of them can read a music CD storing musical data and reproduce music from the musical data.

Further, there have recently appeared video game apparatuses with a music reproducing function, wherein a character in a CG (computer graphic) image is displayed on a display screen and dances autonomously or via an external operation to the accompaniment of a rhythm of reproduced music, so that a game player can enjoy not only the reproduced music itself, but also visually.

For example, JP-A-10-99546 introduces a video dance game apparatus, wherein at least two dance players, i.e. characters, are displayed on a display screen, and a dance contest is carried out depending on a time difference between the timing at which dance technique data of each character is read out via an external operation and the timing at which beat information (information forming the basis of a rhythm of music) contained in dance music is produced. This video dance game apparatus can use only dance music as music (musical data) for extracting the beat therefrom.

In the foregoing video game apparatuses, beat extraction is implemented using a filter on the assumption that reproduced music is dance music so that the frequencies of an instrument beating a rhythm, i.e. the beat generation frequencies, are concentrated to a low frequency band, such as a drum sound. However, there is such dance music wherein the beat generation frequencies do not necessarily fall within the low frequency band. In this event, the accurate beat can not be extracted, thus resulting in lack of objectivity of a dance contest.

Further, in the conventional technique, it is not possible to accurately analyze the rhythm of music, other than dance music, reproduced from a commercial music CD wherein a variety of instruments beat the rhythm, for reflection upon a display figure of a character.

SUMMARY OF THE INVENTION

Therefore, it is an object of the present invention to provide a music reproducing system which can accurately reflect a rhythm component contained in musical data upon a display figure of a character.

It is another object of the present invention to provide a rhythm analyzing method which can accurately analyze a rhythm component of musical data, regardless of a genre such as dance music.

It is another object of the present invention to provide a storage medium for realizing the foregoing music reproducing system on a computer.

According to one aspect of the present invention, there is provided a music reproducing system wherein a character is allocated in advance a favorite rhythm component and a display figure of the character on a screen is changed based on musical data, the system comprising frequency band identifying means for producing sound pressure data for each of a plurality of frequency bands from the musical data and for identifying, based on the sound pressure data for the plurality of frequency bands, one of the plurality of frequency bands which beats a rhythm most; rhythm estimating means for deriving a changing period of a sound pressure component from the sound pressure data for the identified frequency band and for estimating a rhythm component of the sound pressure data for the identified frequency band based on the derived changing period; and control means for changing the display figure of the character according to a matching degree between the estimated rhythm component and the favorite rhythm component.

It may be arranged that the musical data is stored in a portable storage medium and the frequency band identifying means is activated when the musical data is read into the music reproducing system from the portable storage medium.

It may be arranged that the rhythm estimating means derives the changing period by applying an FFT process to the sound pressure data for the identified frequency band, superimposes auxiliary data having a period integer times the changing period onto the sound pressure data for the identified frequency band so as to suppress components other than the rhythm component, and applies an inverse FFT process to the sound pressure data superimposed with the auxiliary data so as to estimate the rhythm component.

It may be arranged that the rhythm estimating means verifies whether the changing period is correct and, when the changing period is verified to be correct, the rhythm estimating means outputs the rhythm component for a predetermined time.

According to another aspect of the present invention, there is provided a music reproducing system connected to a display unit and provided with music inputting means and music reproducing means, the system comprising first storing means for storing a favorite rhythm component for each of characters; second storing means for storing a figure expressing ability for each of the characters, the figure expressing ability used for expressing a display figure of the corresponding character to be displayed on a screen of the display unit; frequency band identifying means for producing sound pressure data for each of a plurality of frequency bands from musical data inputted via the music inputting means, and for identifying, based on the sound pressure data for the plurality of frequency bands, one of the plurality of frequency bands which beats a rhythm most; rhythm estimating means for deriving a changing period of a sound pressure component from the sound pressure data for the identified frequency band and for estimating a rhythm component of the sound pressure data for the identified frequency band based on the derived changing period; and control means for causing one of the characters to be displayed on the screen of the display unit, reading the favorite rhythm component of the one of the characters from the first storing means, updating the figure expressing ability of the one of the characters stored in the second storing means according to a matching degree between the favorite rhythm component read from the first storing means and the rhythm component estimated by the rhythm estimating means, and changing the display figure of the displayed character based on the updated figure expressing ability to the accompaniment of the musical data reproduced by the music reproducing means.

It may be arranged that the control means updates the figure expressing ability of the displayed character so as to be cumulatively increased every time musical data containing the favorite rhythm component is reproduced.

It may be arranged that the music reproducing system further comprises background image control means for changing a background image of the displayed character according to the figure expressing ability.

It may be arranged that the second storing means is an exchangeable nonvolatile storage medium.

According to another aspect of the present invention, there is provided a rhythm analyzing method to be implemented in an apparatus which displays a character allocated in advance a favorite rhythm component on a screen based on a rhythm component of musical data reproduced, the method comprising the steps of producing sound pressure data for each of a plurality of frequency bands from the musical data, and identifying, based on the sound pressure data for the plurality of frequency bands, one of the plurality of frequency bands which beats a rhythm most; deriving a changing period of a sound pressure component from the sound pressure data for the identified frequency band, and estimating a rhythm component of the sound pressure data for the identified frequency band based on the derived changing period; and reflecting a matching degree between the estimated rhythm component and the favorite rhythm component onto control information for changing a display figure of the displayed character.

It may be arranged that the step of deriving the changing period and estimating the rhythm component comprises deriving the changing period by applying an FFT process to the sound pressure data for the identified frequency band, superimposing auxiliary data having a period integer times the changing period onto the sound pressure data for the identified frequency band so as to suppress components other than the rhythm component, applying an inverse FFT process to the sound pressure data superimposed with the auxiliary data and performing a verification process for the sound pressure data applied with the inverse FFT process so as to estimate the rhythm component.

It may be arranged that the rhythm analyzing method further comprises outputting the estimated rhythm component for a predetermined time.

According to another aspect of the present invention, there is provided a storage medium storing program codes readable by a computer which displays a character allocated in advance a favorite rhythm component on a screen based on a rhythm component of musical data, the program codes causing the computer to execute the steps of producing sound pressure data for each of a plurality of frequency bands from the musical data, and identifying, based on the sound pressure data for the plurality of frequency bands, one of the plurality of frequency bands which beats a rhythm most; deriving a changing period of a sound pressure component from the sound pressure data for the identified frequency band, and estimating a rhythm component of the sound pressure data for the identified frequency band based on the derived changing period; and reflecting a matching degree between the estimated rhythm component and the favorite rhythm component onto control information for changing a display figure of the displayed character.

It may be arranged that the program codes cause an operating system of the computer or other program codes to execute a part of the steps.

It may be arranged that the storage medium also stores the musical data and is separable from the computer.

According to another aspect of the present invention, there is provided a storage medium storing program codes readable by a computer which displays a character allocated in advance a favorite rhythm component on a screen based on a figure expressing ability peculiar to the character and a rhythm component of musical data reproduced, the program codes causing the computer to execute the steps of producing sound pressure data for each of a plurality of frequency bands from the musical data, and identifying, based on the sound pressure data for the plurality of frequency bands, one of the plurality of frequency bands which beats a rhythm most; deriving a changing period of a sound pressure component from the sound pressure data for the identified frequency band, and estimating a rhythm component of the sound pressure data for the identified frequency band based on the derived changing period; and updating the figure expressing ability according to a matching degree between the estimated rhythm component and the favorite rhythm component.

It may be arranged that the program codes cause the computer to execute a step of changing a background image of the character according to the figure expressing ability.

It may be arranged that the program codes cause an operating system of the computer or other program codes to execute a part of the steps.

It may be arranged that the storage medium also stores the musical data and is separable from the computer.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a music reproducing system according to a preferred embodiment of the present invention will be described with reference to the accompanying drawings. In this embodiment, the music reproducing system is realized using a known video game apparatus being a kind of a computer, but may also be realized using a general purpose personal computer having a display unit.

In this embodiment, each of characters and a background thereof to be displayed are CG images in the form of polygons, and a display figure, such as a motion of each character and an expression thereof, and a variation of the display figure are realized by control information including program codes for changing the shape of the polygons, and a later-described rhythm analysis result and other variation parameters, and further including a figure expressing ability peculiar to each character and background data.

The variation parameters except the figure expressing abilities of characters, program codes for realizing the music reproducing system on the computer, the program codes for changing the shape of the polygons and the background data (hereinafter collectively referred to as "game program") are prestored in a CD-ROM as an example of a storage medium. Musical data is stored in a commercial music CD separate from the foregoing CD-ROM. The figure expressing abilities are stored in another storage medium described later.

In this embodiment, "musical data" represents data indicative of characteristics of instrument tones, voices and other tones. "figure expressing ability" represents a parameter for expressing magnitudes of motions of a corresponding character and affluence of an expression thereof. The figure expressing ability is allocated per character and the value thereof is cumulatively changed (increased or decreased) depending on reproduced music. "background data" is a parameter for changing a background of a corresponding character and is associated with the figure expressing ability. Specifically, different background data is selected according to the value of the figure expressing ability.

[Video Game Apparatus]

Now, the video game apparatus for constituting the music reproducing system will be described. For the video game apparatus, the technique described in, for example, JP-A-8-212377 can be used.

Specifically, in this embodiment, the foregoing video game apparatus is used for reading the game program stored in the foregoing CD-ROM which is exchangeable and portable. By executing the game program independently or executing it cooperatively with an operating system (OS) of the video game apparatus and other program codes in the apparatus, the music reproducing system is constructed to implement reproduction of music, production and display of CG images, an analysis of the rhythm component contained in musical data, a display control of the CG images based on a result of the rhythm analysis.

Figure 1:
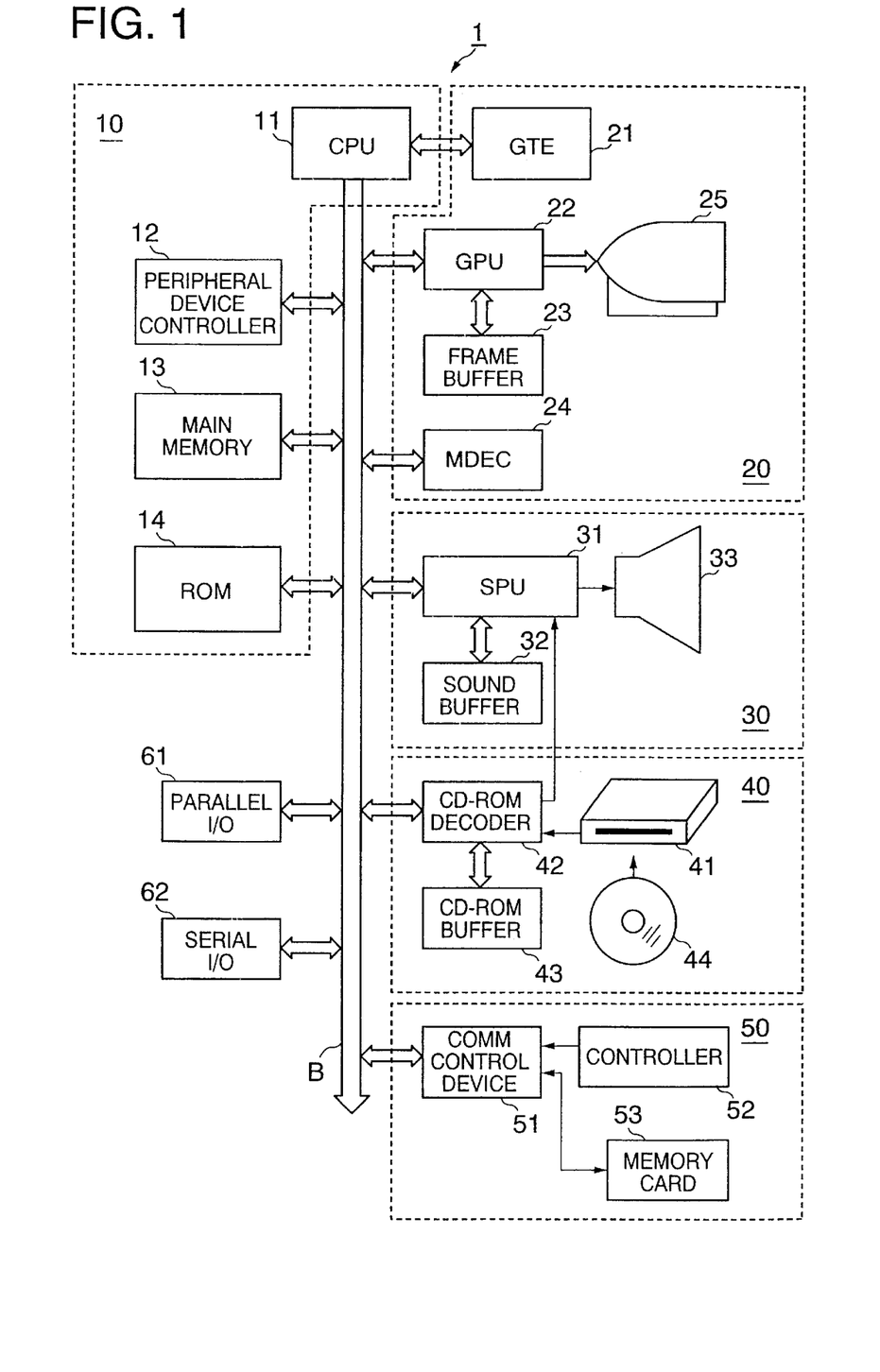
FIG. 1 is a block diagram showing a hardware structure of a video game apparatus for realizing a music reproducing system according to a preferred embodiment of the present invention.

As shown in FIG. 1, the video game apparatus 1 comprises a main control section 10, an image processing section 20, a sound processing section 30, a disk control section 40, a communication control section 50, a parallel input/output (I/O) port 61, a serial input/output (I/O) port 62 and a main bus B connecting the foregoing components 10–50, 61 and 62 to allow two-way communications among them.

The main control section 10 comprises a CPU 11, a peripheral device controller 12 for executing an interrupt control, a DMA (direct memory access) transfer control, etc., a main memory 13 for storing the game program etc., and a ROM 14 storing an operating system (OS) etc. for performing a general control of the components in the apparatus. The CPU 11 is a RISC (reduced instruction set computer) CPU, which executes the OS stored in the ROM 14 and the game program stored in the main memory 13 to realize a plurality of functional blocks which will be described later.

The image processing section 20 comprises a geometry transfer engine (GTE) 21 carrying out high-speed coordinate transformation relative to data to be displayed, a graphics processing unit (GPU) 22 for performing a drawing process of CG images (character, background thereof, etc.) composed of combinations of polygons, such as triangles and quadrilaterals, and sprites according to drawing commands from the CPU 11, a frame buffer 23 for temporarily storing the CG images produced by the drawing process at the GPU 22, and an image decoder (MDEC) 24 for decoding image data as requested. The display unit 25 reads the CG images from the frame buffer 23 and displays them.

By consecutively executing the drawing process of CG images by the GPU 22 and the storing of them into the frame buffer 23, the CG images including motion elements, such as a variation in motion and expression of a character, can be displayed on the display unit 25.

The sound processing section 30 comprises a sound processing unit (SPU) 31 for reproducing music based on musical data, a sound buffer 32 for temporarily storing the musical data, and a loudspeaker 33.

The disk control section 40 comprises a disk drive 41 for reproducing the stored contents of the game program CD-ROM 44 or the music CD so as to be recognized by the CPU 11 (hereinafter referred to as "reproduced data"), a CD-ROM decoder 42 for decoding the reproduced data when error correcting codes (ECC) are added thereto, and a CD-ROM buffer 43 for temporarily storing the reproduced data from the disk drive 41 before storing it into the main memory 13.

The CD-ROM decoder 42 also constitutes a part of the sound processing section 30. Among outputs of the CD-ROM decoder 42, outputs relating to musical data are inputted into the SPU 31.

The communication control section 50 comprises a communication control device 51 for controlling communication with the CPU 11 via the main bus B, a controller 52 for Inputting commands from a game player, and an exchangeable memory card 53 as an example of a nonvolatile storage medium.

The controller 52 is an interface for inputting the will of the game player, such as commands for selecting a character, inputting musical data and reproducing music. The command is fed to the communication control device 51 via synchronous communication.

The communication control device 51 sends command data representing the command from the controller 52 to the CPU 11. In this fashion, the will of the game player is notified to the CPU 11 so that the CPU 11 executes a process corresponding to the will of the game player based on the executing game program. The communication control device 51 also has a function of writing and reading data into and from the memory card 53 based on a command from the CPU 11. Since the memory card 53 is separated from the main bus B, it can be loaded or unloaded with the power being on. Accordingly, a figure expressing ability per character and various kinds of set data can be stored in a memory card 53 peculiar to a game player.

A sound processing apparatus, such as an audio apparatus or a singing play unit system, for reproducing music may be connected to the parallel input/output (I/O) port 61 or the serial input/output (I/O) port 62 so that music from the sound processing apparatus can be inputted via the port 61 or 62. Accordingly, the present invention can be carried out using musical data inputted from not only a music CD but also an external sound processing apparatus. [Music Reproducing System]

When the foregoing video game apparatus 1 is turned on or reset while the CD-ROM 44 and the memory card 53 being loaded, the CPU 11 executes the OS stored in the ROM 14 to first initialize the whole apparatus, then control the disk control section 40 so as to read the game program from the CD-ROM 44 into the main memory 13.

After the completion of the reading, the CPU 11 gives a guidance to load the music CD instead of the CD-ROM 44. Then, following the guidance, the game player loads the music CD into the disk drive 41.

Figure 2:
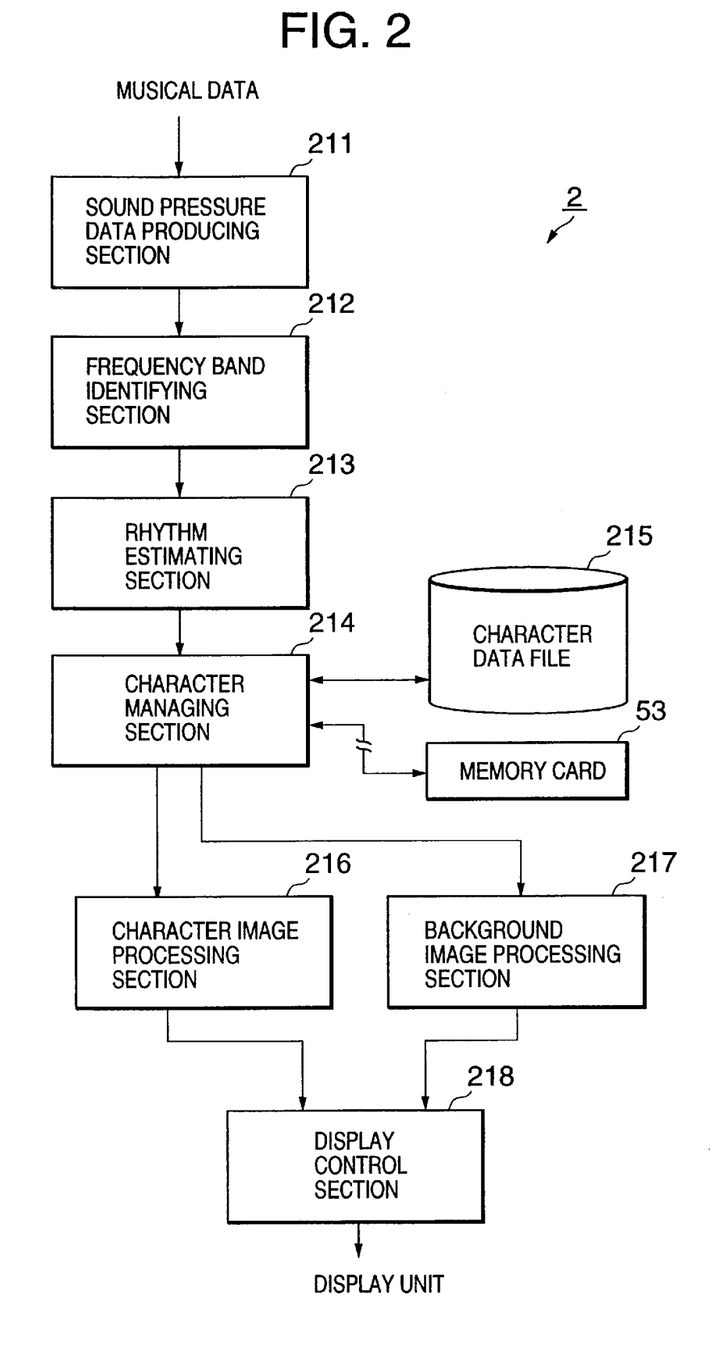
FIG. 2 is a functional block diagram of the music reproducing system according to the preferred embodiment of the present invention.

Through execution of the foregoing game program (including cooperative execution thereof with the OS and other program codes), the CPU 11 produces the functional blocks as shown in FIG. 2 so that the music reproducing system generally designated by numeral 2 is realized.

The music reproducing system 2 comprises a sound pressure data producing section 211, a frequency band identifying section 212, a rhythm estimating section 213, a character managing section 214, a character data file 215, a character Image processing section 216, a background image processing section 217 and a display control section 218.

The sound pressure data producing section 211 produces sound pressure data for each of a plurality of frequency bands from inputted musical data (base data). The frequency band identifying section 212 identifies the frequency band which beats a rhythm most, based on the produced sound pressure data for the plurality of frequency bands. The rhythm estimating section 213 derives a changing period of a sound pressure component from the sound pressure data of the identified frequency band and estimates a rhythm component of the sound pressure data of the identified frequency band based on the derived changing period. The detailed processing will be described later.

The character managing section 214 manages display data relating to a plurality of characters and their backgrounds stored in the character data file 215 and the memory card 53. For example, the character managing section 214 reads a character figure forming element from the character data file 215 based on a command given by the game player via the controller 52, reads a peculiar figure expressing ability stored per character in the memory card 53, judges the matching degree between "favorite rhythm component" allocated per character in the character data file 215 and a rhythm component extracted or estimated from musical data, updates a figure expressing ability of the corresponding character based on a result of the judgment, and reads background data from the character data file 215.

Further, when the game player inputs identification data for identifying one of the characters, the character managing section 214 sends a figure forming element corresponding to a figure expressing ability of the identified character on that time point, to the character image processing section 216. In addition, every time the figure expressing ability reaches a predetermined reference value, the character managing section 214 sends predetermined command data to the background image processing section 217.

"favorite rhythm component" stored in the character data file 215 represents a rhythm band univocally predetermined per character for ensuring intrinsic motions and expressions of the corresponding character and is a parameter to be used as an object for judging the matching degree relative to a rhythm component contained in reproduced music. "favorite rhythm component" is allocated per character upon system design or upon initial setting by a game player.

In this embodiment, each character is allocated, as a favorite rhythm component, one of a first rhythm band where one beat is $^{10}/_{30}$ [sec] to $^{13}/_{30}$ [sec], a second rhythm band where one beat is $^{14}/_{30}$ [sec] to $^{17}/_{30}$ [sec], and a third rhythm band where one beat is $^{18}/_{30}$ [sec] to $^{24}/_{30}$ [sec].

The character image processing section 216 implements image processing relating to character figure display, the background image processing section 217 implements image processing relating to character background display, and the display control section 218 implements a display control for characters and their backgrounds.

Now, an operation of the music reproducing system 2 will be described.

Figure 3:
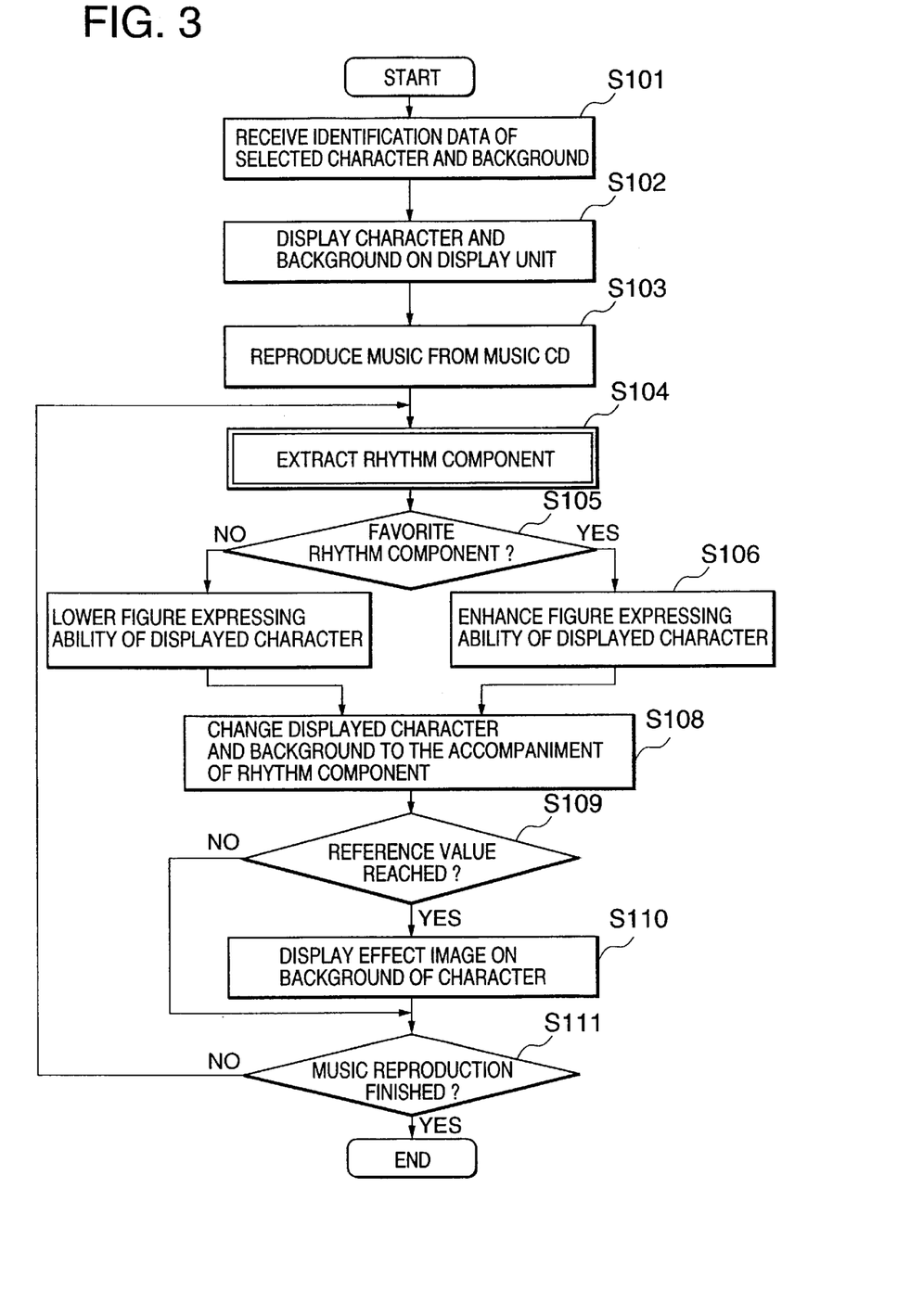
FIG. 3 is a flowchart showing the overall operation sequence of the music reproducing system shown in FIG. 2.

Referring to FIG. 3, the overall operation sequence of the music reproducing system 2 will be first described.

When identification data of a character and a background selected by a game player is inputted via the controller 52 (step S101), the character managing section 214 causes the character and the background to be displayed on the display unit 25 via the character image processing section 216, the background image processing section 217 and the display control section 218 (step S102). Further, the character managing section 214 reads a figure expressing ability and other set data with respect to the displayed character from the memory card 53.

When music is reproduced based on musical data stored in the music CD loaded in the disk drive 41 (step S103), a rhythm component of the reproduced music is extracted (step S104). The rhythm component extraction technique will be described later in detail.

The character managing section 214 judges to what degree the extracted rhythm component matches or agrees with a favorite rhythm component of the displayed character. For brevity of description, it is assumed here that the character managing section 214 only judges whether or not a frequency band of the extracted rhythm component agrees with a frequency band of the favorite rhythm component (i.e. one of the foregoing first to third rhythm bands). If the frequency band of the extracted rhythm component is other than any of the first to third rhythm bands, a rounding process is carried out to round the extracted rhythm component into the most approximate rhythm band.

If both rhythm components agree with each other, the character managing section 214 updates the figure expressing ability of the displayed character so as to be increased (Yes at step S105; step S106). On the other hand, if both do not agree with each other, the character managing section 214 updates the figure expressing ability of the displayed character so as to be lowered (No at step S105; step S107). Then, the character managing section 214 changes in real time the display figure of the displayed character and background according to the updated figure expressing ability (step S108). The timing of changing the display figure is matched with the extracted rhythm component, i.e. the display figure is changed to the accompaniment of the extracted rhythm component.

As the number of times of agreement of an extracted rhythm component with a favorite rhythm component of a displayed character increases, i.e. as the number of times of reproduction of music including a favorite rhythm component of a displayed character increases, a figure expressing ability of the displayed character is updated so as to be cumulatively increased. The character managing section 214 monitors a change of the figure expressing ability and, every time a value of the figure expressing ability reaches a reference value, the character managing section 214 displays a predetermined effect image on the background of the character (Yes at step S109; step S110). As an effect image, it may be arranged, for example, to flash the background to the accompaniment of the rhythm component or to separately display a special item or character.

During reproduction of music, execution of step S104 and subsequent steps is repeated (No at step S111). When the music reproduction Is finished, the figure expressing ability and other set data of the displayed character are stored (updated) into the memory card 53, and the operation sequence is finished (Yes at step S111).

<Rhythm Component Extraction Process>

Figure 4:
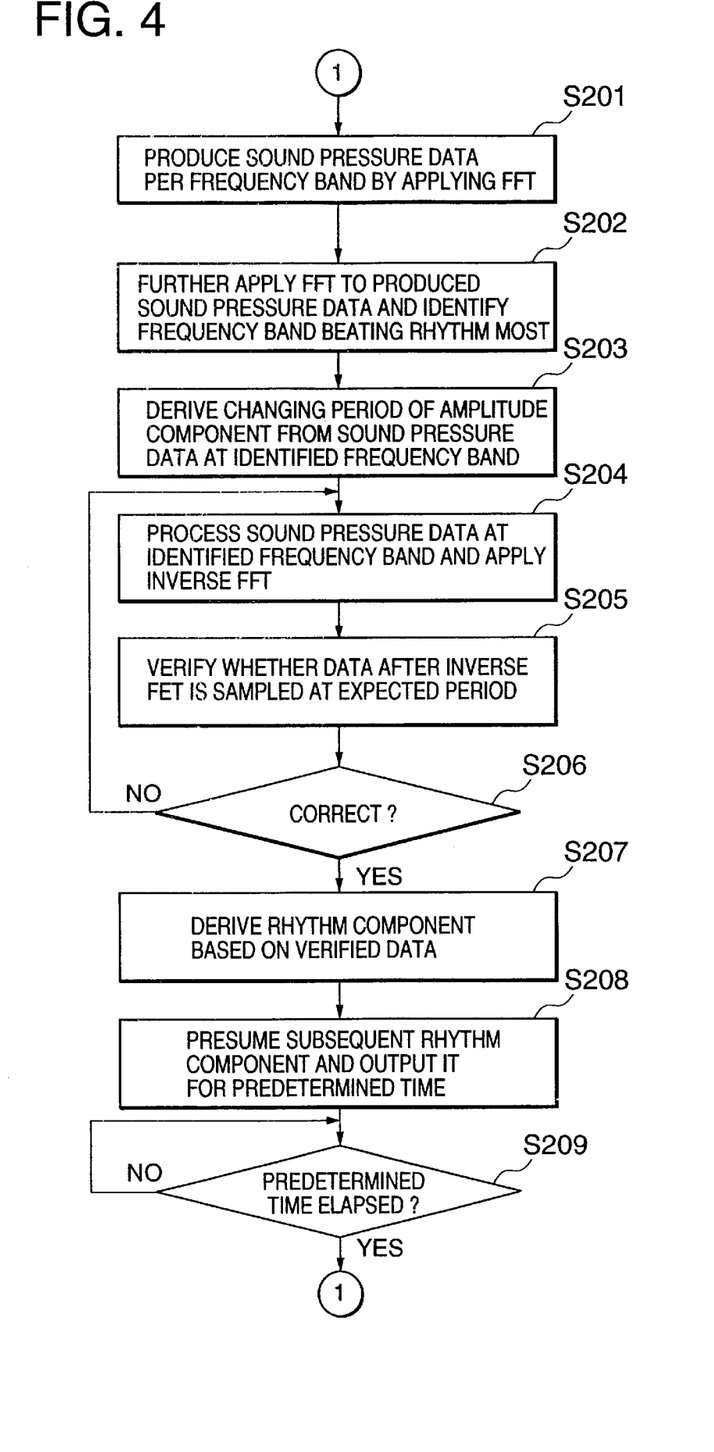
FIG. 4 is a flowchart of a subroutine for rhythm component extraction included in the flowchart shown in FIG. 3.
Figure 5A:
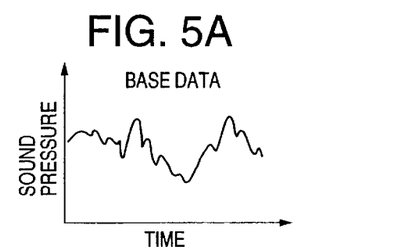
FIG. 5 is a diagram for explaining a technique of rhythm component extraction according to the preferred embodiment of the present invention.
Figure 5B:
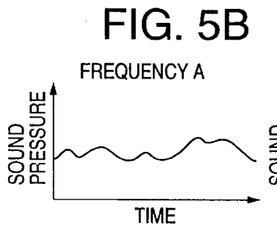
Figure 5C:
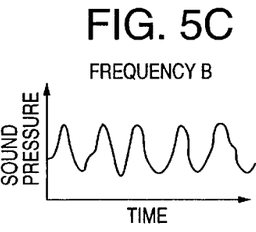
Figure 5D:
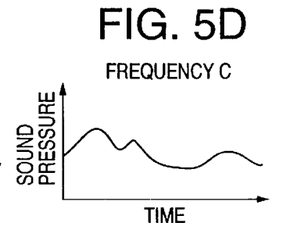
Figure 5E:
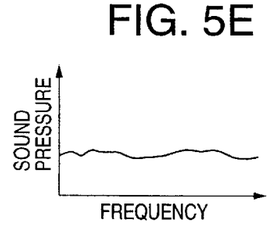
Figure 5F:
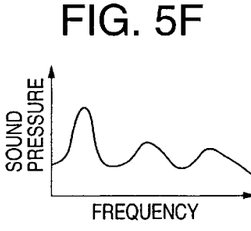
Figure 5G:
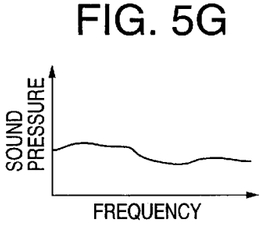
Figure 5H:
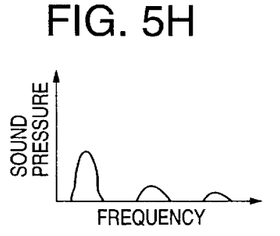
Figure 5I:
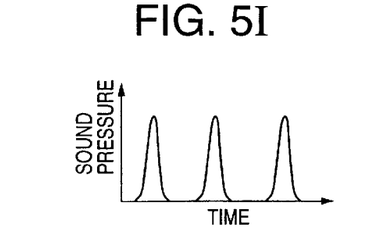
Figure 5J:
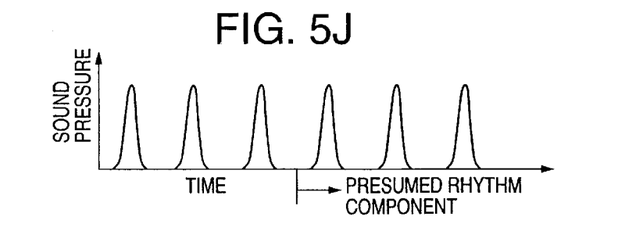

Now, the rhythm component extraction process executed at step S104 will be described in detail with reference to FIGS. 4 and 5.

The rhythm component can be considered as a sound pressure wave of a constant period. Further, in case of musical data, the rhythm component is normally produced by a particular instrument which is determined according to a genre. Moreover, there are mixed various Instrument sound data in musical data, including those beating a constant rhythm and those not beating a constant rhythm.

Accordingly, in the sound pressure data producing section 211, an FFT (Fast Fourier Transformation) process is applied to musical data (base data) of several frames shown at (a) in FIG. 5 so as to produce sound pressure data at frequency bands A, B and C as shown at (b), (c) and (d) in FIG. 5, respectively (step S201). One frame is set to, for example, 1/30 sec, and the FFT process is performed at 44.1 [kHz] for 1/30 [sec]. The reason why the sound pressure data for the plurality of frequency bands are produced is that instruments have their own sound characteristics, for example, a bass drum sound is concentrated to low frequencies, while a drum sound is difficult to pick up at 200 [Hz].

From the sound pressure data shown at (b) to (d) in FIG. 5, it is still not possible to Judge which frequency band (instrument) beats a rhythm. Accordingly, the sound pressure data producing section 211 further applies an FFT process to the sound pressure data at the frequency bands A, B and C shown at (b) to (d) in FIG. 5, so as to obtain sound pressure data as shown at (e), (f) and (g) in FIG. 5.

Then, from the sound pressure data shown at (e) to (g) in FIG. 5, the frequency band identifying section 212 identifies the frequency band which beats a rhythm most, i.e. identifies the frequency band B in FIG. 5 (step S202).

Specifically, if the sound pressure data has a constant period, a given large value appears at a certain frequency after applying the foregoing second FFT process (i.e. in the sound pressure data shown at (e) to (g) in FIG. 5). The frequency band identifying section 212 judges whether there exists such a large value in the sound pressure data shown at (e) to (g) in FIG. 5. If judging positive, the frequency band identifying section 212 determines that the frequency band (frequency band B in FIG. 5) corresponding to the sound pressure data including such a large value (sound pressure data shown at (f) in FIG. 5) is a frequency band which beats a rhythm most.

After identifying the frequency band (instrument) beating the rhythm most, the rhythm estimating section 213 derives a changing period of a sound pressure component (amplitude component) from the corresponding sound pressure data (shown at (f) in FIG. 5) (step S203). Then, the rhythm estimating section 213 superimposes auxiliary data having a period integer times the derived changing period onto the sound pressure data (shown at (c) in FIG. 5), so as to suppress components other than the rhythm beating component to a value of 0 (zero), and then applies an inverse FFT process thereto (step S204). FIG. 5 at (h) shows sound pressure data obtained as a result of applying the inverse FFT process.

Thereafter for enhancing the rhythm extraction accuracy, the rhythm estimating section 213 verifies or inspects whether the sound pressure data (shown at (h) in FIG. 5) after the application of the inverse FFT process is sampled at the expected period (derived changing period) (step S205). Specifically, the rhythm estimating section 213 derives a standard deviation of samples in the sound pressure data after the application of the inverse FFT process and compares it with a predetermined threshold value. If the standard deviation is smaller than the threshold value, meaning that there is no sound pressure protruding portion in the sound pressure data, the rhythm estimating section 213 judges the derived changing period to be incorrect. In this event, the sequence returns to step S204 where the rhythm estimating section 213 changes the period of the auxiliary data and carries out the inverse FFT process (No at step S206). On the other hand, if the derived changing period is judged to be correct, the rhythm estimating section 213 extracts a rhythm component based on the verified data (step S207). FIG. 5 at (i) shows a waveform of the extracted rhythm component (corresponding to the frequency band B in FIG. 5).

The rhythm estimating section 213 estimates or presumes a subsequent rhythm component and outputs it for a predetermined time (step S208). FIG. 5 at (j) shows the presumed rhythm component. After a lapse of the predetermined time, the sequence returns to step S201 (Yes at step S209).

The foregoing predetermined time may be up to the end of the music or may correspond to only several frames.

By executing the foregoing operation sequence, the rhythm component can be extracted quickly and accurately from the musical data so that the timing of changing the character figure can be approximated to the rhythm beaten in the reproduced music. Thus, the game player can visually grasp an image of the reproduced music.

Figure 6:
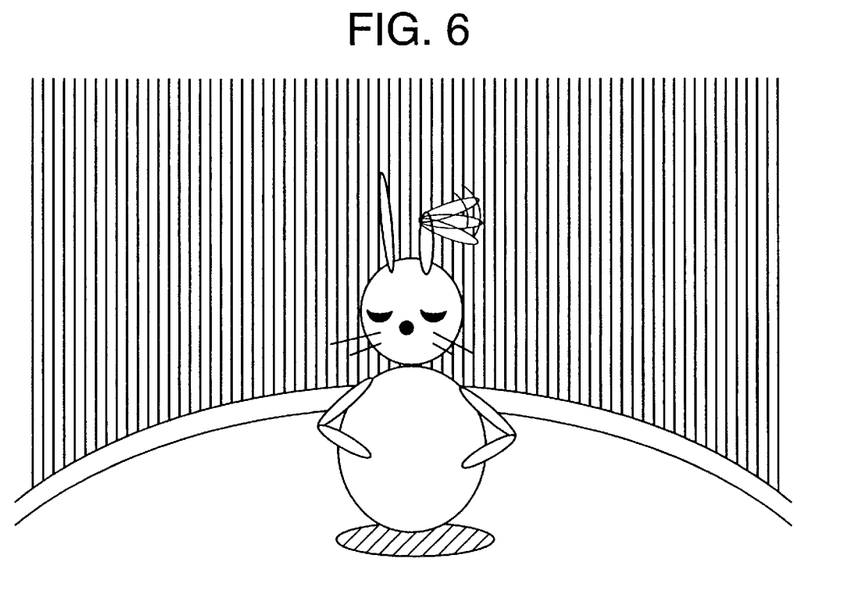
FIG. 6 is a diagram showing an example of a displayed image based on a low figure expressing ability according to the preferred embodiment of the present invention.

As described above, in the foregoing music reproducing system 2, when the rhythm component of the reproduced music does not agree with the favorite rhythm component of the displayed character, the figure expressing ability of the displayed character is lowered. Thus, as shown in FIG. 6, the motion, expression and background of the character scarcely change while music is reproduced.

Figure 7:
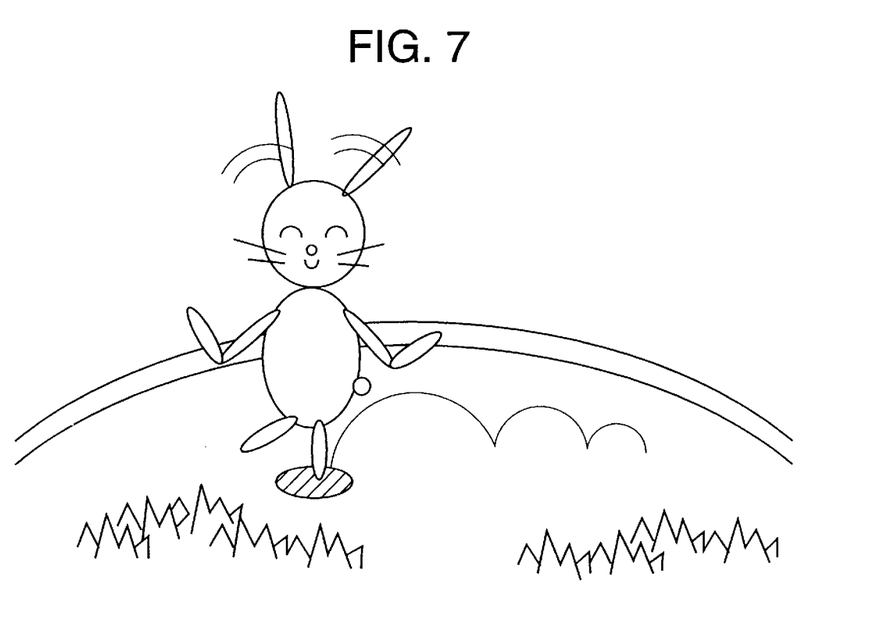
FIG. 7 is a diagram showing an example of a displayed image based on an increased figure expressing ability according to the preferred embodiment of the present invention.

In contrast, as shown in FIG. 7, when music matching with the favorite rhythm component of the character is reproduced, the motion of the character becomes active and the expression thereof also becomes affluent.

Figure 8:
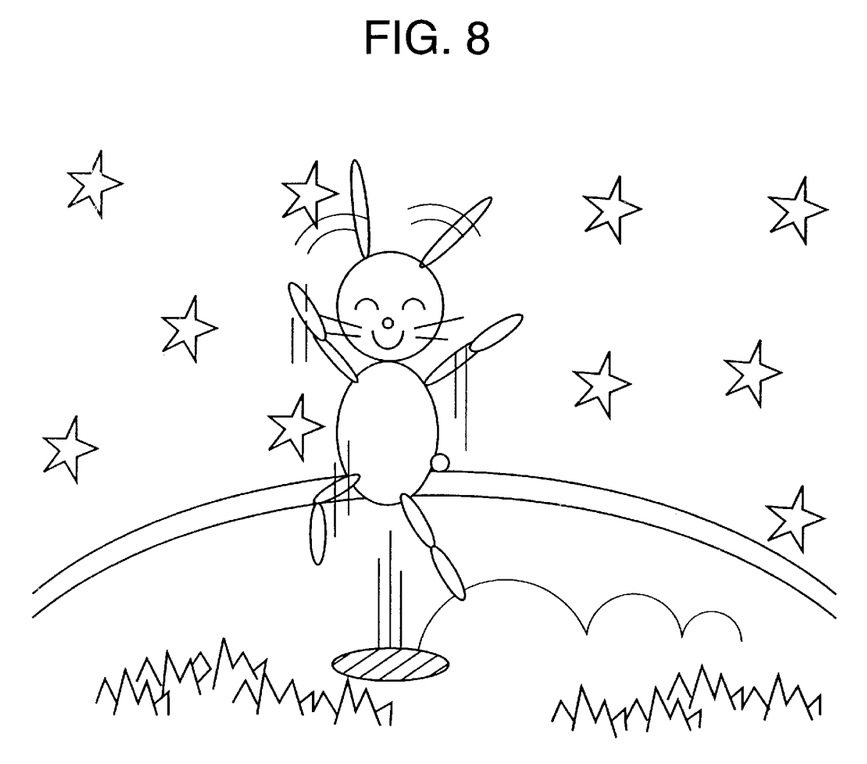
FIG. 8 is a diagram showing an example of a displayed image based on a further increased figure expressing ability according to the preferred embodiment of the present invention.

Further, as shown in FIG. 8, when music matching with the favorite rhythm component is repeatedly reproduced, the figure expressing ability of the character is cumulatively enhanced so that the motion of the character becomes further active and the expression thereof also becomes further affluent. In addition, the background image is also largely changed according to the magnitude of the figure expressing ability, and further, the effect image is displayed every time the figure expressing ability reaches the reference value.

In this fashion, the game player can objectively and accurately seize, by means of CG images, the progress of the display figure of the character changing depending on music the game player listens to, so that attraction can be enhanced.

As described above, since the display figure of the character can be changed in real time according to music, i.e. general entertainment, and further according to the accurate rhythm component thereof, the music reproducing system can be enjoyed by a wide range of game players.

In the foregoing preferred embodiment, for brevity of description, each character is allocated only one favorite rhythm component (i.e. one of the first to third rhythm bands), and it is only judged whether a rhythm component extracted from musical data agrees with the allocated favorite rhythm component. On the other hand, it may also be arranged that different weighting data are set to a plurality of rhythm bands and that the figure expressing ability is increased more remarkably as the extracted rhythm component approaches the favorite rhythm component, while the figure expressing ability is lowered more remarkably as the extracted rhythm component goes away from the favorite rhythm component. It may also be arranged that when the extracted rhythm component does not agree with the favorite rhythm component, the figure expressing ability is temporarily replaced with another parameter, for example, a parameter which suppresses the changing degree of the display figure, instead of lowering the figure expressing ability.

It may also be arranged that the figure expressing ability is divided into, for example, one for character motion display, one for character expression display, one for background display and one for item display, and that when a certain rhythm component is extracted, only the motion of a character is changed. With this arrangement, the display figure of the character based on musical data can be more diversified.

In the foregoing preferred embodiment, the display figure of the character and its background are changed based on the control information containing a parameter of the figure expressing ability. On the other hand, it may also be arranged that the control information includes only a difference or deviation between the extracted rhythm component and the favorite rhythm component, instead of the figure expressing ability. When applied to competition games, there may be a case wherein exclusion of the cumulative change of the figure expressing ability is desirable.

In the foregoing preferred embodiment, musical data is stored in the general music CD other than the CD-ROM 44 storing the game program, and the music CD is loaded into the video game apparatus 1 while the music reproducing system 2 is constituted in the video game apparatus 1. On the other hand, it may also be arranged that the musical data and the game program are stored in the same storage medium.

As seen from the foregoing description, according to the present invention, a rhythm component is accurately analyzed based on desired musical data so that, for example, in a competition game using a result of the rhythm analysis, a competition result can be more objectified.

Further, since a display figure of a displayed character is changed in real time and accurately according to a rhythm component. an image of music can be correctly visualized.

While the present invention has been described in terms of the preferred embodiment and the modifications thereof, the invention is not to be limited thereto, but can be embodied in various ways without departing from the principle of the invention as defined in the appended claims.

What is claimed is:

1. A music reproducing system wherein a character is allocated in advance a favorite rhythm component and a display figure of the character on a screen is changed based on musical data, said system comprising:

frequency band identifying means for producing sound pressure data for each of a plurality of frequency bands from said musical data and for identifying, based on the sound pressure data for the plurality of frequency bands, one of the plurality of frequency bands which beats a rhythm most;

rhythm estimating means for deriving a changing period of a sound pressure component from the sound pressure data for the identified frequency band and for estimating a rhythm component of the sound pressure data for the identified frequency band based on the derived changing period; and control means for changing the display figure of the character according to a matching degree between the estimated rhythm component and the favorite rhythm component.

2. The music reproducing system according to claim 1, wherein said musical data is stored in a portable storage medium and said frequency band identifying means is activated when said musical data is read into said music reproducing system from said portable storage medium.

3. The music reproducing system according to claim 1, wherein said rhythm estimating means derives said changing period by applying an FFT process to the sound pressure data for said identified frequency band, superimposes auxiliary data having a period integer times said changing period onto the sound pressure data for said identified frequency band so as to suppress components other than the rhythm component, and applies an inverse FFT process to the sound pressure data superimposed with said auxiliary data so as to estimate said rhythm component.

4. The music reproducing system according to claim 3, wherein said rhythm estimating means verifies whether said changing period is correct and, when said changing period is verified to be correct, said rhythm estimating means outputs said rhythm component for a predetermined time.

5. A music reproducing system connected to a display unit and provided with music inputting means and music reproducing means, said system comprising:

first storing means for storing a favorite rhythm component for each of characters;

second storing means for storing a figure expressing ability for each of said characters, said figure expressing ability used for expressing a display figure of the corresponding character to be displayed on a screen of said display unit;

frequency band identifying means for producing sound pressure data for each of a plurality of frequency bands from musical data inputted via said music inputting means, and for identifying, based on the sound pressure data for the plurality of frequency bands, one of the plurality of frequency bands which beats a rhythm most;

rhythm estimating means for deriving a changing period of a sound pressure component from the sound pressure data for the identified frequency band and for estimating a rhythm component of the sound pressure data for the identified frequency band based on the derived changing period; and control means for causing one of said characters to be displayed on the screen of said display unit, reading said favorite rhythm component of said one of said characters from said first storing means, updating the figure expressing ability of said one of said characters stored in said second storing means according to a matching degree between said favorite rhythm component read from said first storing means and said rhythm component estimated by said rhythm estimating means, and changing the display figure of said displayed character based on the updated figure expressing ability to the accompaniment of the musical data reproduced by said music reproducing means.

6. The music reproducing system according to claim 5, wherein said control means updates the figure expressing ability of said displayed character so as to be cumulatively increased every time musical data containing said favorite rhythm component is reproduced.

7. The music reproducing system according to claim 5, further comprising background image control means for changing a background image of said displayed character according to said figure expressing ability.

8. The music reproducing system according to claim 5, wherein said second storing means is an exchangeable nonvolatile storage medium.

9. A rhythm analyzing method to be implemented in an apparatus which displays a character allocated in advance a favorite rhythm component on a screen based on a rhythm component of musical data reproduced, said method comprising the steps of:

producing sound pressure data for each of a plurality of frequency bands from said musical data, and identifying, based on the sound pressure data for the plurality of frequency bands, one of the plurality of frequency bands which beats a rhythm most;

deriving a changing period of a sound pressure component from the sound pressure data for the identified frequency band, and estimating a rhythm component of the sound pressure data for the identified frequency band based on the derived changing period; and reflecting a matching degree between the estimated rhythm component and the favorite rhythm component onto control information for changing a display figure of the displayed character.

10. The rhythm analyzing method according to claim 9, wherein the step of deriving said changing period and estimating said rhythm component comprises deriving said changing period by applying an FFT process to the sound pressure data for said identified frequency band, superimposing auxiliary data having a period integer times said changing period onto the sound pressure data for said identified frequency band so as to suppress components other than the rhythm component, applying an inverse FFT process to the sound pressure data superimposed with said auxiliary data and performing a verification process for the sound pressure data applied with said inverse FFT process so as to estimate said rhythm component.

11. The rhythm analyzing method according to claim 9, further comprising outputting said estimated rhythm component for a predetermined time.

12. A storage medium storing program codes readable by a computer which displays a character allocated in advance a favorite rhythm component on a screen based on a rhythm component of musical data, said program codes causing said computer to execute the steps of:

producing sound pressure data for each of a plurality of frequency bands from said musical data, and identifying, based on the sound pressure data for the plurality of frequency bands, one of the plurality of frequency bands which beats a rhythm most;

deriving a changing period of a sound pressure component from the sound pressure data for the identified frequency band, and estimating a rhythm component of the sound pressure data for the identified frequency band based on the derived changing period; and reflecting a matching degree between the estimated rhythm component and the favorite rhythm component onto control information for changing a display figure of the displayed character.

13. The storage medium according to claim 12, wherein said program codes cause an operating system of said computer or other program codes to execute a part of said steps.

14. The storage medium according to claim 12, wherein said storage medium also stores said musical data and is separable from said computer.

15. A storage medium storing program codes readable by a computer which displays a character allocated in advance a favorite rhythm component on a screen based on a figure expressing ability peculiar to the character and a rhythm component of musical data reproduced, said program codes causing said computer to execute the steps of:

producing sound pressure data for each of a plurality of frequency bands from said musical data, and identifying, based on the sound pressure data for the plurality of frequency bands, one of the plurality of frequency bands which beats a rhythm most;

deriving a changing period of a sound pressure component from the sound pressure data for the identified frequency band, and estimating a rhythm component of the sound pressure data for the identified frequency band based on the derived changing period; and updating said figure expressing ability according to a matching degree between the estimated rhythm component and the favorite rhythm component.

16. The storage medium according to claim 15, wherein said program codes cause said computer to execute a step of changing a background image of said character according to said figure expressing ability.

17. The storage medium according to claim 15, wherein said program codes cause an operating system of said computer or other program codes to execute a part of said steps.

18. The storage medium according to claim 15, wherein said storage medium also stores said musical data and is separable from said computer.

* * * * *